United States Patent
Utz et al.

(10) Patent No.: US 8,134,565 B2
(45) Date of Patent: Mar. 13, 2012

(54) SYSTEM, MODULE AND METHOD OF ENABLING A VIDEO INTERFACE WITHIN A LIMITED RESOURCE ENABLED INFORMATION HANDLING SYSTEM

(75) Inventors: James R. Utz, Round Rock, TX (US); Andrew T. Sultenfuss, Leander, TX (US); David Loadman, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 831 days.

(21) Appl. No.: 12/189,005

(22) Filed: Aug. 8, 2008
(Under 37 CFR 1.47)

(65) Prior Publication Data
US 2010/0033629 A1    Feb. 11, 2010

(51) Int. Cl.
*G06F 15/16*    (2006.01)
*G06T 1/00*    (2006.01)

(52) U.S. Cl. ......... 345/520; 345/502; 345/522; 348/553

(58) Field of Classification Search .......................... None
See application file for complete search history.

(56) References Cited

U.S. PATENT DOCUMENTS

| | | | |
|---|---|---|---|
| 4,720,798 A | 1/1988 | Reed et al. |
| 4,747,041 A | 5/1988 | Engel et al. |
| 4,809,163 A | 2/1989 | Hirosawa et al. |
| 5,251,320 A | 10/1993 | Kuzawinski et al. |
| 5,303,171 A | 4/1994 | Belt et al. |
| 5,410,497 A | 4/1995 | Viletto |
| 5,586,270 A | 12/1996 | Rotier et al. |
| 5,644,760 A | 7/1997 | Polzin et al. |
| 5,692,197 A | 11/1997 | Narad et al. |
| 5,727,231 A | 3/1998 | Bartley et al. |
| 5,748,912 A | 5/1998 | Lee |
| 5,768,164 A | 6/1998 | Hollon, Jr. |
| 5,793,979 A | 8/1998 | Lichtman et al. |
| 5,835,732 A | 11/1998 | Kikinis et al. |
| 5,919,264 A | 7/1999 | Reneris |
| 5,951,688 A | 9/1999 | Moyer et al. |
| 5,978,923 A | 11/1999 | Kou |

(Continued)

FOREIGN PATENT DOCUMENTS
EP    1 460 529 A2    9/2004

(Continued)

OTHER PUBLICATIONS

Garbee et al., "Platform-based Power Management and Linux," HP Development Company; 2010.

(Continued)

*Primary Examiner* — Kee M Tung
*Assistant Examiner* — Michelle Chin
(74) *Attorney, Agent, or Firm* — Larson Newman, LLP

(57) ABSTRACT

A system, module, and method of enabling a video interface within a limited resource enabled information handling system are disclosed. In a particular form, a processing module can include a processor configured to initiate an outputting of a video signal to a host processing system including a video display. The processing module can further include a Mini-card enabled interface operable to be coupled to the host processing system to the host processing system to allow the video signal to be transmitted there between. The processing module can also include a video output channel configured within the Mini-card enabled interface and accessible to the processor to output the video signal to the host processing system.

20 Claims, 5 Drawing Sheets

U.S. PATENT DOCUMENTS

| | | | |
|---|---|---|---|
| 5,999,997 | A | 12/1999 | Pipes |
| 6,029,211 | A | 2/2000 | Nakashima |
| 6,038,671 | A | 3/2000 | Tran et al. |
| 6,078,967 | A | 6/2000 | Fulghum |
| 6,233,692 | B1 | 5/2001 | Villanueva |
| 6,404,623 | B1 | 6/2002 | Koshika |
| 6,411,825 | B1 | 6/2002 | Csapo et al. |
| 6,523,079 | B2 | 2/2003 | Kikinis et al. |
| 6,545,448 | B1 | 4/2003 | Stanley et al. |
| 6,549,968 | B1 | 4/2003 | Hart |
| 6,584,533 | B1 | 6/2003 | Cho et al. |
| 6,586,849 | B2 | 7/2003 | Tarr |
| 6,608,400 | B1 | 8/2003 | Muehsam |
| 6,711,691 | B1 | 3/2004 | Howard et al. |
| 6,732,216 | B2 | 5/2004 | Shaw |
| 6,735,663 | B2 | 5/2004 | Watts, Jr. et al. |
| 6,735,708 | B2 | 5/2004 | Watts, Jr. |
| 6,745,221 | B1 | 6/2004 | Ronca |
| 6,760,852 | B1 | 7/2004 | Gulick |
| 6,778,834 | B2 | 8/2004 | Laitinen et al. |
| 6,801,196 | B1 | 10/2004 | Bodley et al. |
| 6,801,974 | B1 | 10/2004 | Watts, Jr. et al. |
| 6,816,925 | B2 | 11/2004 | Watts, Jr. |
| 6,826,391 | B2 | 11/2004 | Leinonen et al. |
| 6,898,727 | B1 | 5/2005 | Wang et al. |
| 7,010,634 | B2 | 3/2006 | Silvester |
| 7,082,373 | B2 | 7/2006 | Holle |
| 7,149,837 | B2 | 12/2006 | Watts, Jr. et al. |
| 7,197,584 | B2 | 3/2007 | Huber et al. |
| 7,281,148 | B2 | 10/2007 | Munguia |
| 7,380,142 | B2 | 5/2008 | Lee et al. |
| 7,590,101 | B2 | 9/2009 | Forand et al. |
| 7,633,744 | B2 | 12/2009 | Kuhn |
| 7,636,560 | B2 | 12/2009 | Ku |
| 7,720,506 | B1 | 5/2010 | Gribble |
| 7,725,748 | B1 | 5/2010 | Kedia et al. |
| 7,895,365 | B2 | 2/2011 | Rofougaran et al. |
| 7,913,182 | B2 | 3/2011 | Bear et al. |
| 7,917,784 | B2 | 3/2011 | de Cesare et al. |
| 7,925,298 | B2 | 4/2011 | Chen et al. |
| 2002/0103005 | A1 | 8/2002 | Watts, Jr. et al. |
| 2003/0065734 | A1 | 4/2003 | Ramakesavan |
| 2003/0110306 | A1 | 6/2003 | Bailis et al. |
| 2003/0135803 | A1* | 7/2003 | Hong .................. 714/726 |
| 2003/0176176 | A1 | 9/2003 | Leinonen et al. |
| 2004/0063425 | A1 | 4/2004 | Wakutsu et al. |
| 2004/0088262 | A1 | 5/2004 | Boucher et al. |
| 2004/0160435 | A1 | 8/2004 | Cui et al. |
| 2004/0162107 | A1 | 8/2004 | Klemetti et al. |
| 2004/0203709 | A1 | 10/2004 | Luneau |
| 2004/0268005 | A1 | 12/2004 | Dickie |
| 2005/0064911 | A1 | 3/2005 | Chen et al. |
| 2005/0066006 | A1 | 3/2005 | Fleck et al. |
| 2005/0076085 | A1 | 4/2005 | Budd et al. |
| 2005/0138267 | A1 | 6/2005 | Bains et al. |
| 2005/0240702 | A1 | 10/2005 | Kunkel et al. |
| 2005/0267779 | A1* | 12/2005 | Lee et al. .................. 705/1 |
| 2005/0268106 | A1 | 12/2005 | Mansell et al. |
| 2006/0026447 | A1 | 2/2006 | Naveh et al. |
| 2006/0079275 | A1 | 4/2006 | Ella et al. |
| 2006/0129855 | A1 | 6/2006 | Rhoten et al. |
| 2006/0129861 | A1 | 6/2006 | Kee et al. |
| 2006/0230294 | A1 | 10/2006 | Chaiken et al. |
| 2006/0236014 | A1 | 10/2006 | Yin et al. |
| 2006/0238439 | A1 | 10/2006 | Fuller et al. |
| 2007/0094435 | A1 | 4/2007 | Fry et al. |
| 2007/0098085 | A1* | 5/2007 | Shih .................. 375/240.26 |
| 2007/0213105 | A1 | 9/2007 | Huber et al. |
| 2007/0239921 | A1 | 10/2007 | Toorians et al. |
| 2007/0283239 | A1 | 12/2007 | Morris |
| 2008/0004889 | A1 | 1/2008 | Edwards et al. |
| 2008/0070593 | A1 | 3/2008 | Altman et al. |
| 2008/0140872 | A1 | 6/2008 | Wright |
| 2008/0272880 | A1 | 11/2008 | Sutardja et al. |
| 2009/0031329 | A1 | 1/2009 | Kim |
| 2009/0125732 | A1 | 5/2009 | Oya et al. |

FOREIGN PATENT DOCUMENTS

| | | | |
|---|---|---|---|
| WO | WO 2007/004178 A1 | 1/2007 | |

OTHER PUBLICATIONS

Hewlett-Packard, "Power Regulator for ProLiant," Technology Overview, Rev. 2; Jun. 2005.

Actel Corporation, "Total System Power: Evaluating the Power Profile of FPGAs," 2008.

* cited by examiner

SYSTEM, MODULE AND METHOD OF ENABLING A VIDEO INTERFACE WITHIN A LIMITED RESOURCE ENABLED INFORMATION HANDLING SYSTEM

FIELD OF THE DISCLOSURE

This disclosure relates generally to information handling systems, and more particularly to a system, module, and method of enabling a video interface within a limited resource enabled information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can be configured to use a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
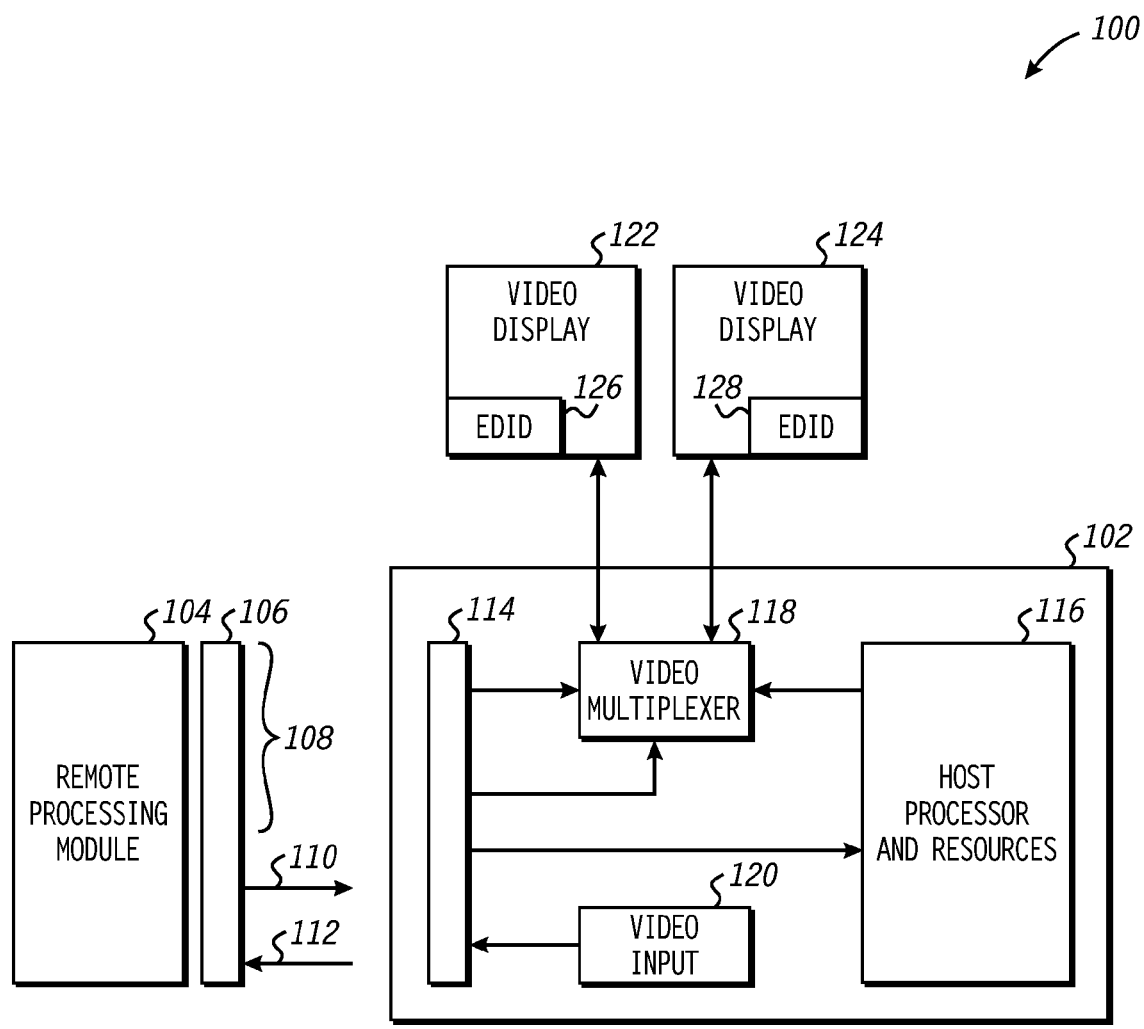
FIG. 1 illustrates a functional block diagram of an information handling system according to an aspect of the disclosure.

The following description in combination with the figures is provided to assist in understanding the teachings disclosed herein. The following discussion will focuses on specific implementations and embodiments. This focus is provided to assist in describing the teachings and should not be interpreted as a limitation on the scope or applicability of the teachings. However, other teachings can certainly be used in this application. The teachings can also be used in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

In the description below, a flow charted technique may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

According to an aspect of the disclosure, a processing module can include a processor configured to initiate an outputting of a video signal to a host processing system including a video display. The processing module can further include a Mini-card enabled interface operable to be coupled to the host processing system to the host processing system to allow the video signal to be transmitted there between. The processing module can also include a video output channel configured within the Mini-card enabled interface and accessible to the processor to output the video signal to the host processing system.

According to another aspect of the disclosure, a method can include detecting an operating condition of a host processing system, and detecting a video output event of a Mini-card enabled processing module. The method can also include outputting a video output signal from the Mini-card enabled processing module to a video multiplexer configured to output video using a display of the host processing system.

According to a further aspect of the disclosure, an information handling system comprising is disclosed. The information handling system can include a host processor configured to output video at a display, and a processing module operably coupled to the host processor. The processing can include a local processor configured to initiate an output of a video signal to the display, and a Mini-card enabled interface operable to output the video signal. The processing module can further include a video output channel configured within the Mini-card enabled interface and accessible to the local processor to output the video signal.

FIG. 1 illustrates a functional block diagram of an information handling system 100 configured to employ a main board 104 configured to interface a processing module 104. In one form, the information handling system 100 can be a computer system such as a desktop computer, notebook computer, server or various other types of information handling systems. The information handling system 100 can also be realized, in whole or in part, as information handling system 200 illustrated in FIG. 2, remote processing module 300 illustrated in FIG. 3, the information handling system 500 illustrated in FIG. 5, or any other information handling system operable to employ information handling system 100.

According to an aspect, the information handling system 100 can include a remote processing module (RPM) 104 that can be configured as a Mini-card processing module that complies with Mini PCI Express Card Electromechanical Specification Revision dated Mar. 19, 2003. Other Mini PCI Express Card specifications, and future versions thereof, can also be employed alone, or in combination as desired. In a particular form, RPM 104 can include a Qualcomm Mini-card, Part Number MSM 7200A, Snapdragon cards, or other cards or Mini-cards. RPM 104 can further include a processing module interface 106 configured as a Mini-card enabled interface that includes multiple inputs and outputs collectively illustrated at 108. The processing module interface 106 also includes a video output 110 configured to output a video signal to main board 104. The processing module interface 106 further includes a video input 112 configured to couple a video signal from main board 102 to RPM 104.

The information handling system 100 also includes a host interface 114 configured to couple to processing module interface 106 to main board 102. Main board 102 can include various types of resources including a host processor and resources 116. Host processor and resources 116 can be selectively enabled and disabled based on a desired operating state as described below. Main board 102 can also include a video multiplexer 118, and a video input 120 configured to couple a video input signal to RPM 104 using video input 112. Video multiplexer 118 can further include one or more outputs configured to output a video signal to be displayed using a video display 122, a video display 124, another video display, or any combination thereof. According to a further aspect, main board 102 can include multiple video multiplexers that can be used to display video to multiple displays (not illustrated). In other forms, video multiplexer 118 can be located within RPM 104, or as a separate module that can be coupled to the main board 102.

During operation, RPM 104 can be coupled to main board 102, and can be used by host processor and resources 116 as a Mini-card enabled processing module. For example, RPM 104 can include one or more wireless communication devices (not illustrated) configured to communicate with a local area network (LAN), wide area network (WAN), or various other digital subscriber wireless communication networks, alone, or in various combinations. RPM 104 can also receive a video input signal from main board 104 at video input 120 and video input channel 112. Further, RPM 104 can also output video using video output channel 110. Video output channel 110 can couple a video signal to the video multiplexer 118 to be output to one or more display 122, 124.

According to a further aspect, host processor and resources 116 can be placed in a reduced operating state that can include powering down a host processor and various other power consuming components, devices, etc. For example, a portable computing system can be place in hibernate, standby, off, or various other reduced operating states. RPM 104 can initiate outputting video to one or more video display 122, 124 during the reduced power state. For example, RPM 104 can initiate coupling a video output signal using video output channel 110. Video multiplexer 118 can detect the video output signal output by the processing module 108. Video multiplexer 118 can further detect a video class of the video signal, and can determine an output format to output the video output signal. For example, a video class can be detected using an electronic device identifier (EDID) 126 of the display 122 and the EDID 128 of the display 124. Each EDID 126 and 128 can include display capability information encoded within the EDID sufficient to determine a video class. As such, the video mux 118 can be used to upscale or downscale a video signal as desired to be displayed on a specific display. According to an aspect, the host processor and resources 116, the RPM 104, or any combination thereof can process the video data to be output to a specific display using a specific EDID.

In a particular embodiment, RPM 104 can be configured as a Mini-card enable module. Further, RPM 104 can detect an event during a reduced operating state of information handling system 100. As such, the event detected by RPM 104 can initiate outputting a video signal from RPM 104 to the main board 102. Further, the video signal can be coupled to the video multiplexer 118. The video multiplexer 118 can be powered during a reduced operating state of information handling system 100, and can output a video signal to a display 122, 124. As such, information handling system 100 need not be powered to a run or fully operating state to output the video signal, thereby reducing the amount of power consumed by the information handling system 100 when outputting an event detected using RPM 104.

According to another aspect, the host interface 114 can be configured to be used by RPM 104 and/or only a Mini-card module. For example, when a buyer purchases an information handling system, a user may desire to have an information handling system configured with RPM 104. However, in other forms, a user may not desire to purchase a system configured with RPM 104. As such, main board 102 employing host interface 114 allows a user to purchase various modules without having to reconfigure interface 114 or resources of main board 102. In this manner, in a particular form, RPM 104 can be purchased by a user and installed as a built to order information handling system. In other forms, a user can purchase a Mini-card module, or no module at all.

Figure 2:
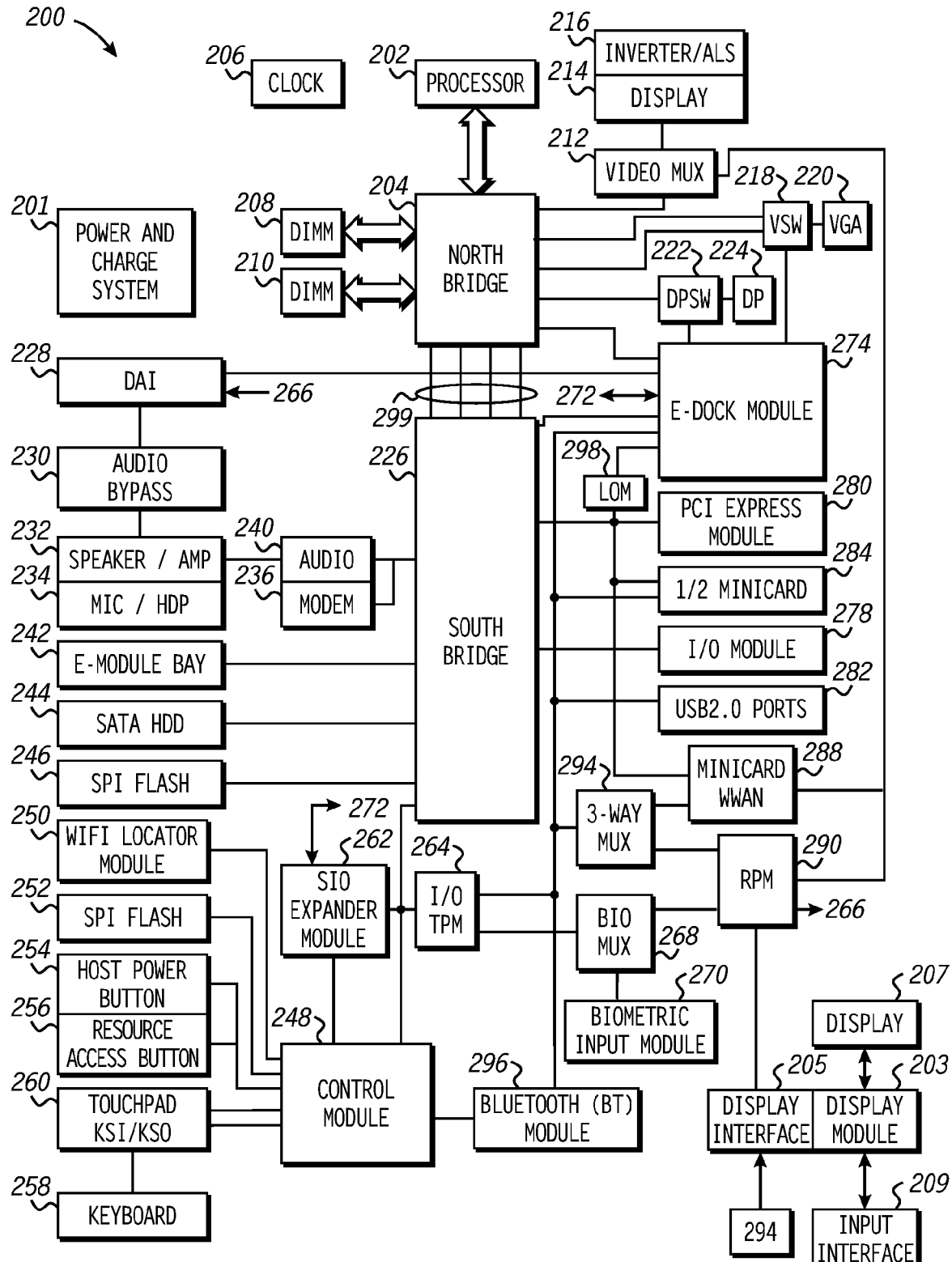
FIG. 2 illustrates a functional block diagram of an information handling system employing a processing module configured to output video during a reduced operating state according to an aspect of the disclosure.

FIG. 2 illustrates a functional block diagram an information handling system employing a processing module configured to output video during a reduced operating state according to an aspect of the disclosure. The information handling system 200 can include a processor 202, coupled to a north bridge 204. A clock 206 can output a timing signal to the processor 202 and other components or resources of the information handling system 200 as needed or required. The north bridge 204 can be further coupled to a dual in-line memory module (DIMM) 208 and a DIMM 210. The north bridge 204 can also be coupled to a video multiplexer (Video MUX) 212 operable to multiplex and output video signals to be displayed using a display 214. The display 214 can include an inverter and automatic light sensor (ALS) module 216. The north bridge 204 can be further coupled to a video switch (VSW) module 218 and a video graphics array (VGA) port 220. A display port (DP) 224 can be coupled to a display port switch (DPSW) 222 operable to be coupled to the north bridge 204, and an E-Dock module 274. The E-Dock module 274 that can be used to expand resources of the information handling system 200, and in various forms, enable access to a battery or charge source, a media slice, an I/O box, a printer interface, or various other resources that can be accessed when docking the information handling system 200 to a docking module.

The information handling system 200 can also include a south bridge 226 coupled to the north bridge 204 using a data bus 299. A digital audio interface (DAI) module 228 can receive a digital audio signal from an input source 266. In an aspect, a remote processing module 290 or other modules can be coupled to the DAI 228 to input a digital audio signal as the input source 266. For example, the DAI module 228 can also be coupled to an E-Dock source 274. An audio bypass 230 can be further coupled to a speaker and amplifier 232, and a microphone and headphone (MIC/HDP) 234. The south bridge 226 can also be coupled to a modem 236 such as an RJ-11 or plain old telephone system (POTS) enabled modem, and an audio output module 240 operable to couple audio output signals using the south bridge 226.

The south bridge 226 can be coupled to the E-Module bay 242 which can include a bay or cavity that can be used to enable couple and decouple resources that can access an internal bus of the information handling system 200 and can be further coupled to the south bridge 226. For example, the E-Module bay 242 can be coupled to the south bridge 226 using a multiplexer such as 3-way Mux 294 operable to couple a resource coupled to E-Module bay 242. Examples of resources can include disk drives, optical drives, batteries, I/O expander modules, smart card readers, and various combinations thereof. The information handling system 200 further includes a serial advanced technology attachment hard disk drive (SATA HDD) 244, and a serial peripheral interface (SPI) flash memory 246. The south bridge 226 can also be coupled to a serial I/O (SIO) integrated flash module 248. The SIO integrated flash module 248 can be coupled to a wireless fidelity (WIFI) locator module 250 which can refer to any type of 802.11x or any other short-range wireless communication. The SIO integrated flash module 248 can also be coupled to an SPI flash module 252, a host power button 254, and a resource access button interface 256 that can include one or more resource access buttons. The SIO integrated flash module 248 can also be coupled to a keyboard 258 and touchpad and KSI/KSO module 260. An SIO expander module 262 can also be coupled to the SIO integrated flash module 248 and can further be coupled to an I/O trusted platform module (TPM) 264. The I/O TPM 264 can further be coupled to a biometric multiplexer (BIO MUX) 268, and a biometric input 270 operable to detect user biometrics (e.g. fingerprint recognition, face recognition, iris detection, EKG/heart monitoring, etc.). The information handling system 200 can also include a security engine (not illustrated) that can be coupled to the biometric inputs using the RPM 290 that can enable and disable access to portions or all of the information handling system 200.

According to an aspect, the E-Dock module 274 can also be coupled to the SIO integrated flash module 248 and SIO expander module 262 via interface 272. The south bridge 226 can further be coupled to an I/O module 278, a peripheral computer interconnect (PCI) express module 280 using a PCI express bus. The south bridge 226 can further be coupled to universal serial bus (USB) 2.0 access ports 282 via a host USB bus. A ½ Mini Card module 284 and a Minicard wireless wide area network (WWAN) module 288 can also be coupled to the south bridge 226 using a PCI express bus.

The information handling system 200 can further include the RPM 290 operable to be coupled to a display 292. RPM 290 can be realized as RPM 104 described in FIG. 1, RPM 400 described in FIG. 4, RPM 500 described in FIG. 5, or any other module operable as needed or desired. RPM 290 can further be configured to output a video signal to the video MUX 212 to output to the display 214. The RPM 290 can also be coupled to a three (3) way multiplexer 294. The three (3) way multiplexer 294 can multiplex USB signals of the Minicard WWAN 288, the RPM 290, and the USB bus coupled to the south bridge 204. The south bridge 226 can further be coupled to a Bluetooth (BT) module 296 via the USB bus. The south bridge 226 can also be coupled to a local area network (LAN) on Motherboard (LOM) 298 via a PCI express bus of the information handling system 200. The LOM 298 can also be coupled to the PCI express module 280. The information handling system 200 also includes a power and charge system 201 operable to distribute power to each component of the information handling system 200, and charge rechargeable power sources of the information handling system 200.

According to a further aspect, the RPM 290 can be coupled to a display interface 205, display module 203 and a display 207. The display interface 205 can further be coupled to the three (3) way MUX 294. The display module 203 can further be coupled to an input interface 209 that can include an array of inputs. According to an aspect, the input interface 209 can include a touch screen interface and controller coupled to the display module 203 and display 207.

Figure 4:
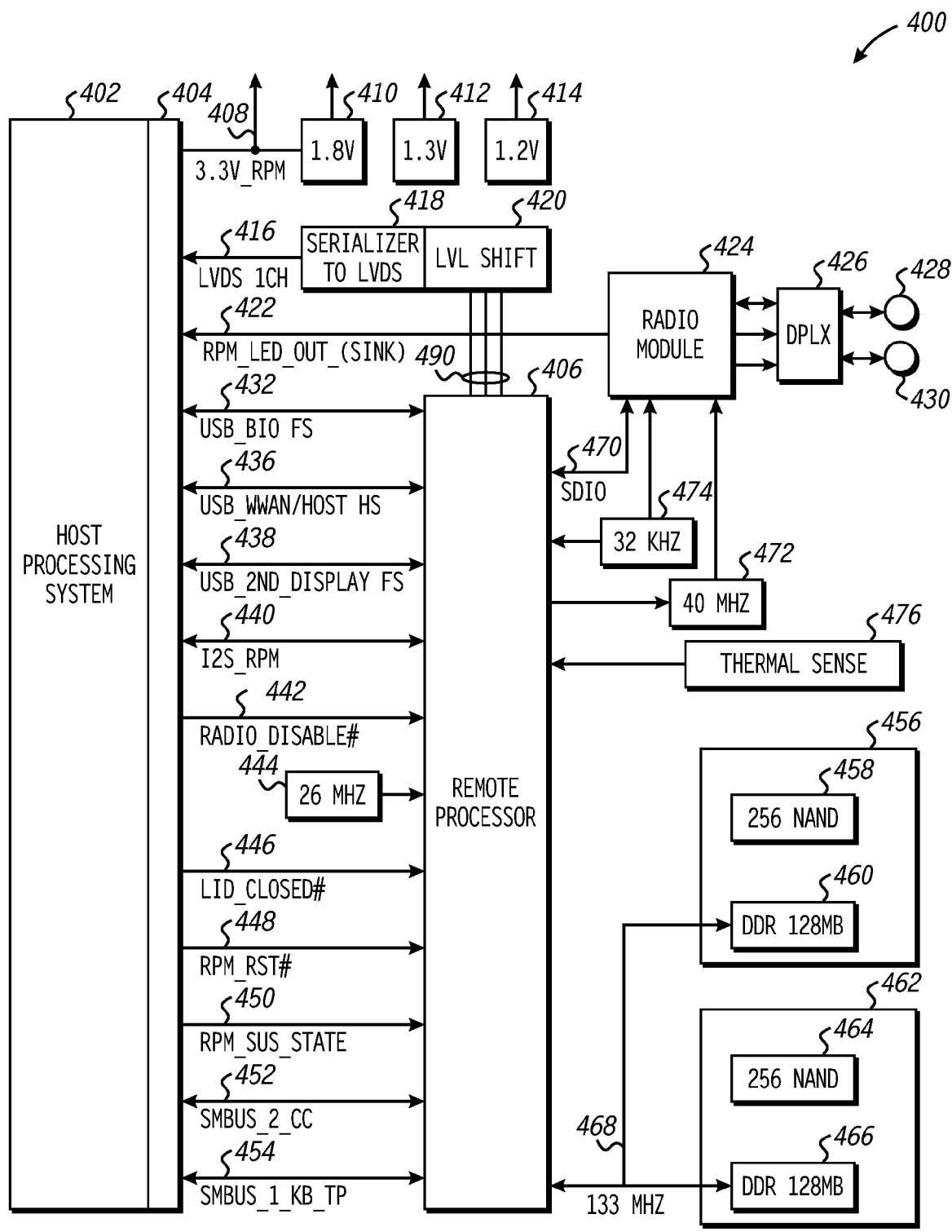
FIG. 4 illustrates a functional block diagram of a remote processing module according to another aspect of the disclosure.
Figure 5:
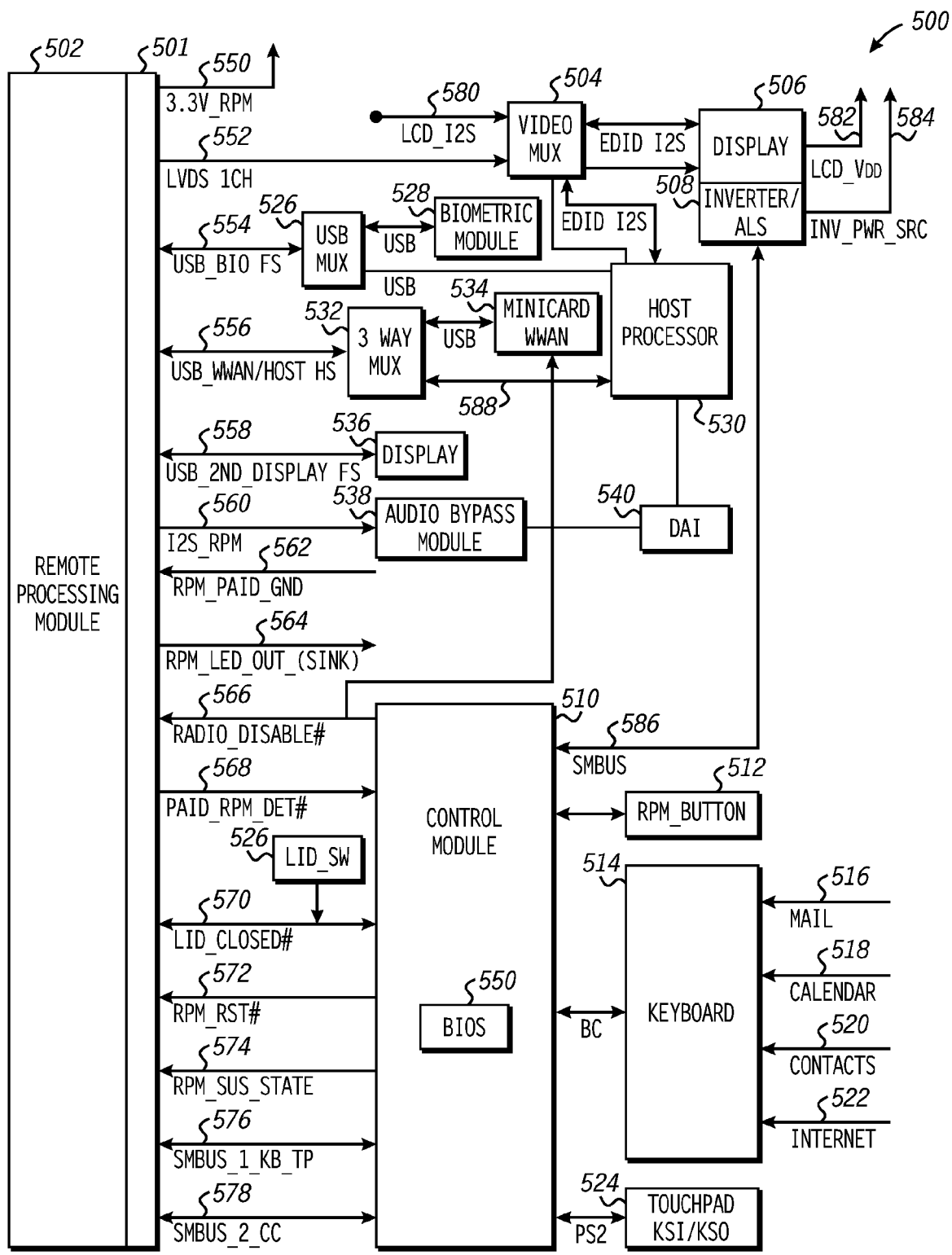
FIG. 5 illustrates a functional block diagram of an information handling system employing a host interface configurable to be coupled to a remote processing module according to an aspect of the disclosure.

According to an aspect, the Minicard WWAN 288 and the RPM 290 can be realized as the same module or device and can be coupled to the information handling system 200 using a Minicard WWAN enabled interface. FIG. 1, FIG. 4, and FIG. 5 describe several embodiments that include a Minicard WWAN enabled interface.

During operation, RPM 206 can be configured to detect a user initiated event, a non-user initiated event, network events, clock events, location events, timer events, power events, or any combination thereof. For example, a user initiated event can include a user activating a key, button, or other type of hardware, software, or user selectable interface, or combinations thereof, that can generate a user activated event. For example, a user can select a button to access a messaging application of the information handling system 200. As such, the RPM 290 can detect a request to access the messaging application and the RPM 290 can initiate access to resource of the information handling system 200 during a reduced operating state of the information handling system 200.

According to another aspect, the RPM 290 can detect a non-user initiated event. For example, the information handling system 200 can employ the Minicard WWAN 288 operable to receive communication signals via a wireless communication. The Minicard WWAN 288, coupled to the RPM 290, can detect the non-user initiated event. The control module 248, the RPM 290, or any combination thereof can identify a resource profile (not illustrated) of the detected event, and initiate activation of resources of the information handling system 200 to process the non-user initiated event. In another form, a software update can be received and an update can be initiated without user intervention. In another form, an auto-power off feature can be used with a GPS feature of the Minicard WWAN 288. According to a further aspect, non-user initiated events, user initiated events, or any combination thereof can be detected.

According to an aspect, a resource profile can include a listing of resources of the information handling system 200 sufficient to process an event. The RPM 104 and the control module 248 can initiate activation of resources based on the resource profile using the detected event, and resources available to process the event. As such, the information handling system 200 need not be initialized to process all events, and a limited amount of resources can be activated.

In another form, the information handling system 200 can detect a non-user initiated event communicated to an electronic device other than the information handling system 200 during a reduced operating state of the information handling system 200. For example, the RPM 290 can be configured to detect a message formatted to be received by a smart phone device, Blackberry device, or any type of electronic device configured to receive messages. For example, the information handling system 200 employing the Minicard WWAN 288 operable to detect wireless messages communicated via any network operable to communicate messages.

In an exemplary form, the information handling system 200 can be operating in a low-power operating state that can include sufficient resources to detect a wireless signal. As such, the RPM 290 can determine a current operating state of the information handling system 200, and can initiate enabling resources to process and output a response to the received wireless signal. As such, an operating environment to output a response to a message, such as a Blackberry message, can be enabled using a limited amount of resources without having to initialize additional resources of the information handling system 200. For example, the RPM 290 in combination with the control module 248 can be used to enable access to the display 214 to output a received message. Additionally, the keyboard 258 or other input devices of the information handling system 200 can be powered to enable a user to view and respond to a message. As such, a limited resource operating environment can be generated to enable receipt and response to messages without having to initialize the information handling system 200. In the manner, the information handling system 200 can be realized as a laptop or notebook system that can be used to receive messages that may be intended for a Blackberry or other type of messaging device, thereby allowing a user to view messages using a larger display relative to the Blackberry device or smart phone device, and draft and respond to messages using the keyboard 258 and the display 214 as desired.

Figure 3:
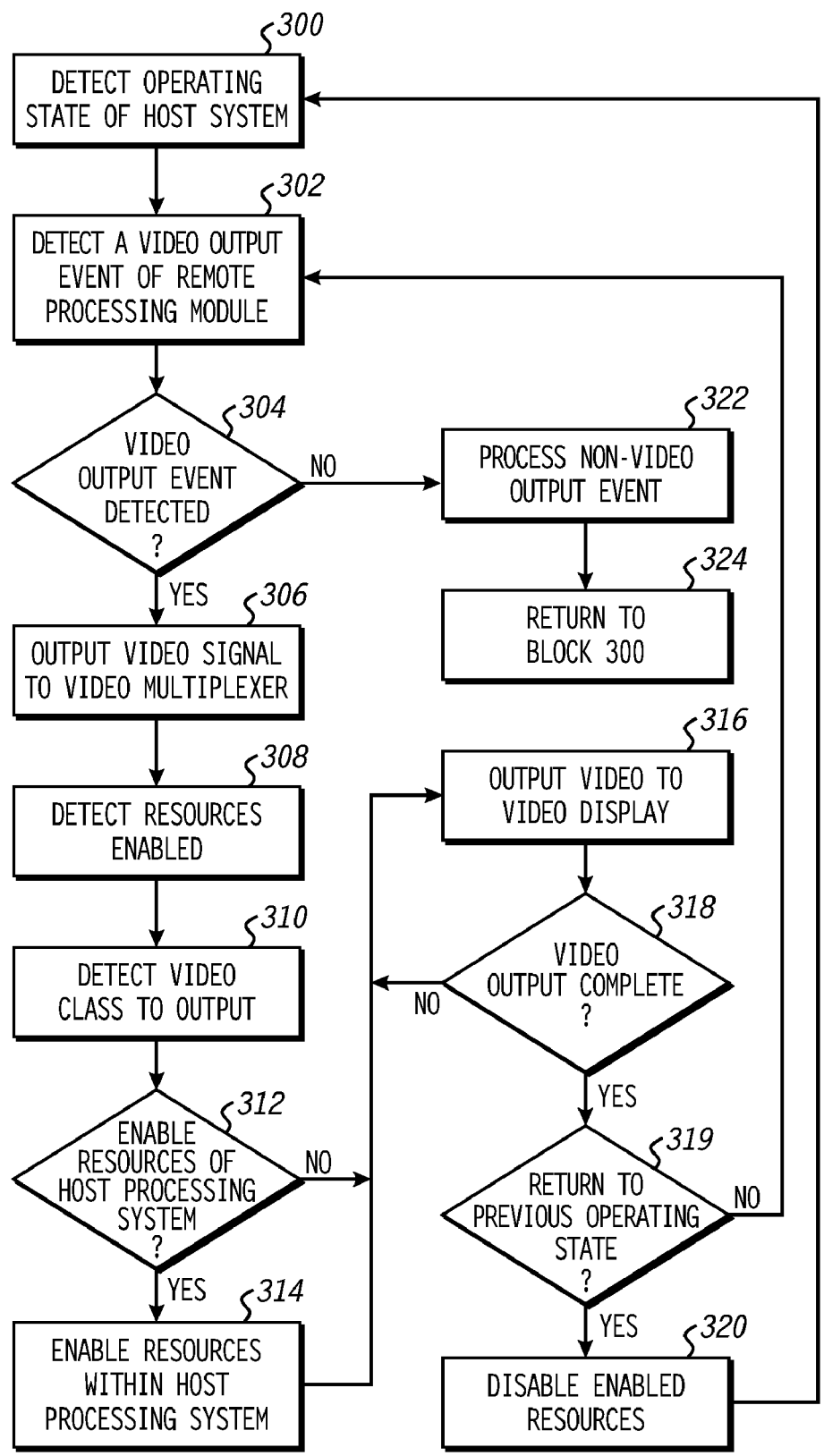
FIG. 3 illustrates a flow diagram of a method of processing video information using a processing module according to an aspect of the disclosure.

FIG. 3 illustrates a flow diagram of a method of processing video information using a processing module according to an aspect of the disclosure. FIG. 3 can be employed in whole, or in part, by the information handling system 100 depicted in FIG. 1, the information handling system 200 described in FIG. 2, the remote processing module 400 described in FIG. 4, the information handling system 500 illustrated in FIG. 5, or any other type of system, controller, device, module, processor, or any combination thereof, operable to employ all, or portions of, the method of FIG. 3. Additionally, the method can be embodied in various types of encoded logic including software, firmware, hardware, or other forms of digital storage mediums, computer readable mediums, or logic, or any combination thereof, operable to provide all, or portions of, the method of FIG. 3.

The method can begin at block 300, as an operating state of a host system can be detected. For example, an information handling system can be placed in a reduced power state, such as a hibernate state, standby state, or other reduced power states. Upon detecting an operating state, the method can proceed to block 302 and detects a video output event of a remote processing module. For example, an information handling system can be configured with a remote processing module operable to detect events that can initiate altering an operating state of a host information handling system. The remote processing module can further detect video that can be coupled to a display of the host system. For example, the remote processing module can detect an email message event, Blackberry message event, meeting event, or various other events that may initiate access to a display of a host information handling system.

The method can then proceed to decision block 304, and detects whether a video output event can be detected. If a video output event cannot be detected, the method proceeds to block 322 and processes the non-video output event. The method can then proceed to block 300 and repeats. If at decision block 304, the method detects a video output event, the method can proceed to block 306 and outputs a video signal to a video multiplexer. For example, a remote processing module can be configured to include a Minicard enabled interface operable to output a video signal to a multiplexer to display using a display of a host system. In other forms, the remote processing module can include a video multiplexer configured to multiplex and output a video signal to a host information handling system.

The method can then proceed to block 308 and detects resources enabled at the host system. For example, a limited amount of resources can be enabled at the host system based on an operating state of the host system. As such, upon detecting enabled resources of the host system, the method can proceed to block 310 and detects a video class to output to the display. For example, a video class can be determined by detecting an EDID of a display and the video to be output can be upscaled or downscaled based on a video display class or capability of the display to output the video. The method can then proceed to decision block 312 and detects whether to enable resources of the host processing system. If no other resources should be enabled, the method can proceed to block 316 as described below. If at decision block 312, additional resources should be enabled, the method can proceed to block 314 and additional resources of the host information handling system can be enabled. The method can then proceed to block 316 and the video can be output to an enabled video display.

Upon outputting the video, the method can proceed to decision block 318 and detects whether a video output has completed. If a video output has not been completed (e.g. an output video signal is present), the method can proceed to lock 316 and repeats. If at decision block 318, the video output has completed, the method can proceed to decision block 319 and determines whether to return to the previous operating state. If the previous operating state should be returned, the method can proceed to block 320 and disables the enabled resources. The method can then proceed to block 300 and repeats as needed or desired. If at decision block 318, the previous operating state should not be returned, the method can proceed to block 302 and repeats as needed or desired.

FIG. 4 illustrates a functional block diagram of a remote processing module 400 employing a Minicard enabled interface 401 configured to be coupled to a host processing system 402 according to an aspect of the disclosure. The remote processing module 400 can include the RPM 104 described in FIG. 1, the RPM 290 described in FIG. 2, or any other module that can be coupled to a host interface 402 to enable access to an information handling system.

According to an aspect, the remote processing module 400 can include a remote processor 406 such as a Texas Instrument (TI) OMAP 2430, 3430, Nvidia AP10, AP15, Motorola I.MX 32, 51, or any other processor that can be used as a processor within the MMPM 400 The remote processing module 400 can also include a 3.3 Volt input signal 408 coupled input from the host processing system 402 via the Minicard enabled interface 404. The 3.3 Volt input signal can be used to generate a 1.8 Volt signal 410, a 1.3 Volt signal 412, and a 1.2 Volt signal 414 to power various components within the remote processing module 400.

According to a further aspect, the Minicard enabled interface 404 can output a low voltage display signal ("LVDS 1CH") 416 output by a serializer-to-LVDS module 418 and a level (LVL) shift module 420. For example, the serializer to LVDS module and LVL shift module 420 can be operable to convert signals from a parallel type input 490 coupled to the LVL shift 420, to a serialized output using the serializer-to-LVDS module 418. Although described as an LVDS 1 CH signal, an LVDS 2 CH signal, or any combination thereof can be output. According to another aspect, a display port, a high definition media interface (HDMI) enabled port, or any combination thereof can be also used, and signals output can be converted as needed or desired. The LVL shift module 420 can be coupled to the remote processor 406 via a data bus 490. The Minicard enabled interface 404 can further include a radio synch signal ("RPM_LED_OUT_(Sink)") 422 output by a radio module 424. The radio module 424 can be configured as a WIFI (e.g. B, G, etc.) radio and can be coupled to a duplex module 426 operable to receive signals from a first antenna 428 and a second antenna 430. The radio module 424 can be integrated as a part of the remote processor 406, or in other forms can accessed as a resource of the remote processor 406. According to a further aspect, the duplex module 426 can be configured to duplex signals of the antenna 428 and the antenna 430. For example, each antenna 428 and 430 and can be activated and deactivated independently or in combination, and used via the radio module 424 in response to an operating condition of the remote processor 406 and a desired signal to be sent or received.

The Minicard enabled interface 404 can also include a USB link operable to communicate a USB bio signal ("USB_BIO FS") 432 between the Minicard enabled interface 404 and the remote processor 406. The Minicard enabled interface 404 can also be used to couple a WWAN-Host signal ("USB_WWAN/HOST HS") 436 to the remote processor 406 using a USB link. The Minicard enabled interface 404 can also be used to couple a secondary display signal ("USB_2nd_display FS") 438 to the remote processor 406 using a USB link.

The Minicard enabled interface 404 can also be used to couple an I²S enabled signal ("I2S_RPM") 440 to the remote processor 406. The Minicard enabled interface 404 can also be used to couple a radio disable input signal ("Radio_disable#") 142 to the remote processor 406. The remote processor 406 can receive a twenty-six megahertz clock signal 444 from a local crystal or other clocking device. The Minicard enabled interface 404 can also couple additional signals to the remote processor 406 that can include a reset signal ("RPM_RST#") 448, can be used to reset the module 400, components within, or any combination thereof. The MMPM_RST# signal 448 can also be used to reset the host system 402, and components thereof The MMPM_RST# signal 448 can be enabled as a shared signal or as a non-shared signal accessible by the host system 402, the local processor 406, or any combination thereof A "MMPM_SUS_State" signal 450 can include a suspend signal to alter a state of the MMPM 400 and can be used to enable or recover from a suspend state. For example, the MMPM 400 can be placed in a suspend state and recoverable using the MMPM_SYS_State signal 450. In another form, the MMPM_SYS_State 450 signal can be used to enable the host system 402 or components thereof. The MMPM_SYS State 450 can be enabled as a shared signal or as a non-shared signal accessible by the host system 402, the local processor 406, or any combination thereof.

According to a further aspect, a the interface 404 can include a "SMBUS_2_CC" signal 452 that can be used as a command control bus operable to couple control information between the host system 402 and the local processor 406. The SMBS_2_CC signal 452 can be used to control audio volume, LCD brightness, etc. of the host processor 402. The interface 404 can also include a "SMBUS_1_KB_TP" signal 454 operable to be couple keyboard touchpad interface signals that can be read by a controller of a keyboard, touchpad, etc. and converted and coupled to the remote processor 406.

According to a further aspect, the remote processor 404 can access a resource module 456 including 256K NAND memory 458 and 128 MB of DDR memory 460. The remote processor 404 can also be coupled to a resource module 462 including 256K NAND memory 464 and 128 MB of DDR memory 466. Each resource module 456 and 462 can be coupled to the remote processor 404 using a 133 MHz data bus 468. Other memory sizes and bus speeds can also be used.

According to a further aspect, the remote processor 404 can also be coupled to the radio module 424 using an SDIO bus 470. The remote processor 404 can further output a 40 MHz clock signal 472 that can be coupled to the radio module 424. A 32 KHz signal 474 can further also be coupled to the radio module 424 and the remote processor 404 to synchronize signal timing. A thermal sense input 476 can also be coupled to the remote processor 404 to monitor operating temperature of the remote processing module 400.

FIG. 5 illustrates a functional block diagram of an information handling system 500 employing a host interface 501 configurable to be coupled to a remote processing module 502 according to an aspect of the disclosure. The remote processing module 502 can include the RPM 104 described in FIG. 1, RPM 290 described in FIG. 2, RPM 400 described in FIG. 4, or any other module that can be coupled to a host interface 402 to enable access to the information handling system 500.

According to an aspect, the host interface 501 can be coupled to a video multiplexer 504 operable to multiplex and output a single channel low voltage display signal (LVDS 1 CH) output by the remote processing module 502 to be displayed using the display 506 or another display. In a form, the remote processing module 502 and host interface 501 can be realized as Minicard enabled interfaces. For example, the host interface 501 can be coupled to a Minicard enabled interface 502 of the information processing system 500. The RPM 502 can include a Minicard module, such as a Minicard WWAN, and resources configured to enable a video signal, "LVDS 1 CH" to the video MUX 504.

The information handling system 500 can also include a control module 510 that can include a BIOS 550 operable to be used to initiate various resources of the information handling system 500. The inverter and ALS module 508 can be coupled to the control module 510 via an SMBUS. The control module 510 can also be coupled to a RPM power button 512 operable to initiate a remote processor operating mode of the information handling system 500 using the RPM 502. The control module 510 can also be coupled to a keyboard 514 that can include a qwerty keyboard having a mail button 516, a calendar button 518, a contacts button 520, and an Internet access button 522. Each button 516, 518, 520, and 522, alone or in combination, can be configured as a separate module or a part of another portion of the information handling system 500. The keyboard 514 can also include various other types of function keys as needed or desired. According to an aspect, the display can be a touch screen enabled display and can couple an input to the control module 510.

The information handling system 500 can also include a USB MUX 526 coupled to a biometric module 528 operable to input biometrics of a user. The USB MUX 526 can further be coupled to a host processor 530 of the information handling system 500, and the host interface 501.

In another embodiment, a "LCD_I2S" signal can be coupled directly to the RPM 502 and can be selectively enabled by the RPM module 502 and can be used to identify a type of display installed. For example, a display classification can be determined and read using the LCD_I2S input 580. As such, an video output format can be determined to be output to the display 506. The video MUX 504 couples the multiplexed signal to the display 506 powered by a display power source ("LCD Vdd") 582. The display 506 includes an inverter and ALS module 508 powered by an inverter power source ("INV_PWR_SRC") 584.

The control module 510 can also be coupled to a touchpad 524 that enables use of a pointer or pointing device that can be displayed on the display 506. The control module 510 can also be coupled to a lid switch ("LID_SW") input 526 operable to alter a signal when a lid or display of the information handling system 500, other type of mobile information handling system, may be opened or closed.

According to a further aspect, the host interface 501 can also include the audio bypass ("I2S_BLT") input 538 coupled to an audio bypass module 538. The audio bypass module 538 can be coupled to a digital audio interface (DAI) module 540 via an I²S bus. The DAI module 540 can further be coupled to the host processor 530 via the I²S bus.

According another aspect, the host interface 501 can also include various other inputs, outputs, or combinations thereof. For example, the host interface 501 can include a voltage source input ("3.3V_RPM") 550, a USB enabled biometric link ("USB_BIO FS") 554, a USB enabled WWAN and host system link ("USB_WWAN/HOST HS") 556, a USB enabled second display link ("USB_2nd Display FS") 558, a I²S ("I2S_RPM") input 560, a ground input ("RPM_PAID_GND") 562, and an RPI LED ("RPM_LED_Out (Sink)") output 564.

The host interface 501 can also include a radio disable ("Radio_disable#") input 566, a paid detection ("PAID_RPM_DET#") input 568, a RPM reset ("RPM_RST#") input 572, a RPM sustain state ("BLT_SUS_State") input 574, a SMBUS keyboard enable ("SMBUS_1_KB_TP") link 576, and an SMBUS 2 CC ("SMBUS_2_CC") link 578.

According to a further aspect, the WWAN access ("USB_WWAN/HOST HS") link 556 can be coupled to a three (3) way MUX 532. The Minicard WWAN 534 can be configured to be coupled to the host processor 530 using a USB enabled bus. The RPM 502 can also be coupled a display 536 using display ("USB_second display") link 558.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A processing module comprising:
   a processor configured to initiate an outputting of a video signal to a host processing system including a video display;
   a Mini-card enabled interface operable to be coupled to the host processing system to allow the video signal to be transmitted there between;
   a video output channel configured within the Mini-card enabled interface and accessible to the processor to output the video signal to the host processing system;
   a video multiplexer configured to couple the video output channel to the display of the system, wherein the video multiplexer is integrated within a housing configured to house the Mini-card enabled processor and the processor; and
   a Mini-card enabled processor configured to be coupled to the Mini-card enabled interface.

2. The processing module of claim 1, wherein:
   the video multiplexer is further configured to detect a class of video output by the video output channel; and
   the video multiplexer is further configured to access a display resource of the host processing system in response to a detected class of video.

3. The processing module of claim 1, wherein the processor is further configured to process video data to output to the video multiplexer.

4. The processing module of claim 1, wherein the Mini-card enabled interface further includes a video input interface configured to receive an input video signal from the host processing system.

5. The processing module of claim 1, further comprising:
   a Mini-card enabled processor configured to be accessed by the host processor during a run time of the host processor; and
   the Mini-card enabled processor configured to be accessed by the processor during a reduced operating state of the host processing system.

6. The processing module of claim 1, further comprising the video multiplexer configured to output a first video output signal to drive a first display and a second video output signal to drive a second display.

7. The processing module of claim 6, wherein:
   wherein the first display includes a primary display of the host processing system; and
   wherein the second display includes a secondary display of the host processing system.

8. A method comprising:
   detecting an operating condition of a host processing system;
   detecting a video output event of a Mini-card enabled processing module; and
   outputting a video output signal from the Mini-card enabled processing module to a video multiplexer integrated within a housing configured to house the Mini-card enabled processing module, the multiplexer being configured to output video using a display of the host processing system.

9. The method of claim 8, further comprising:
   detecting a video class of the video output signal at the video multiplexer; and
   determining a display resource of the host processing system to output the video output signal.

10. The method of claim 8, further comprising:
    detecting a reduced operating state of the host processing system;

determining whether to enable a particular resource of the host processing system to output the video output signal;
enabling the particular resource of the host processing system; and
outputting the video output signal from the Mini-card enabled module to the video multiplexer.

11. The method of claim 10, further comprising:
detecting a first video output including a first video class output by the Mini-card enabled processing module using the video multiplexer; and
detecting a second video output including a second video class output by a resource other than the Mini-card enabled processing module at the video multiplexer, wherein the second video class is different than the first video class.

12. The method of claim 11, further comprising:
outputting the first video output from the video multiplexer to a first display of the host processing system; and
outputting the second video output from the video multiplexer to a second display of the host processing system.

13. The method of claim 12, further comprising:
detecting an event operable to enable access to the Mini-card enabled module; and
enabling a video output channel of the Mini-card enable module.

14. The method of claim 13, further comprising:
wherein the event is detected by the host processing system;
disabling a portion of the resources of the host processing system in response to the detected event; and
enabling a second portion of the resources of the host processing system.

15. The method of claim 8, further comprising:
detecting a class of video using the multiplexer;
multiplexing the video output signal with a host video output signal to generate a multiplexed video output signal; and
outputting the multiplexed video output signal to the display of the host processing system.

16. An information handling system comprising:
a host processor configured to output video at a display; and
a processing module operably coupled to the host processor, the processing module including:
a local processor configured to initiate an output of a video signal to the display;
a Mini-card enabled interface operable to output the video signal;
a video output channel configured within the Mini-card enabled interface and accessible to the local processor to output the video signal; and
a video multiplexer integrated within a housing and configured to house the Mini-card enabled interface and the local processor.

17. The information handling system of claim 16, wherein the a video multiplexer is configured to multiplex the video signal of the video output channel with a host video signal.

18. The information handling system of claim 17, further comprising:
a wireless enabled Mini-card module coupled to the Mini-card enabled interface;
wherein the video multiplexer is configured to output the video signal during a reduced operating state of the host processor; and
wherein the video multiplexer is configured to output a second video signal to the display during a non-reduced operating state of the host processor, wherein the second video signal is different from the first video signal.

19. The information handling system of claim 16, wherein the video multiplexer is further configured to detect a class of video output by the video output channel, and to access a display resource of the host processor in response to a detected class of video.

20. The information handling system of claim 16, wherein the Mini-card enabled interface further includes a video input interface configured to receive an input video signal from the host processing system.

* * * * *